(12) United States Patent
Brncick et al.

(10) Patent No.: US 7,980,617 B2
(45) Date of Patent: Jul. 19, 2011

(54) VEHICLE SEAT WITH BACK-SUPPORT AND SHOULDER-SUPPORT WINGS

(75) Inventors: Gregory Brncick, Holland, MI (US); Robert Fitzpatrick, Holland, MI (US)

(73) Assignee: Cosco Management, Inc., Wilmington, DE (US)

( * ) Notice: Subject to any disclaimer, the term of this patent is extended or adjusted under 35 U.S.C. 154(b) by 29 days.

(21) Appl. No.: 12/503,747

(22) Filed: Jul. 15, 2009

(65) Prior Publication Data
US 2011/0012386 A1    Jan. 20, 2011

(51) Int. Cl.
*B60N 2/32* (2006.01)
*B60N 2/48* (2006.01)
(52) U.S. Cl. .................... 296/64; 296/65.16
(58) Field of Classification Search .......... 296/64, 296/65.01, 65.16, 69; 297/232, 233, 238, 297/248, 257, 354.13, 383
See application file for complete search history.

(56) References Cited

U.S. PATENT DOCUMENTS

| 1,922,502 | A | * | 8/1933 | Scragg | 297/116 |
| 2,621,708 | A | * | 12/1952 | Luce, Jr. | 297/117 |
| 4,496,189 | A | * | 1/1985 | Tanizaki et al. | 297/63 |
| 4,596,420 | A | * | 6/1986 | Vaidya | 297/233 |
| 4,881,702 | A | * | 11/1989 | Slettebak | 244/118.6 |
| 6,811,200 | B2 | * | 11/2004 | Shibata et al. | 296/64 |
| 7,077,474 | B2 | * | 7/2006 | Satani | 297/236 |
| 7,341,302 | B2 | * | 3/2008 | Slade | 296/65.01 |
| 7,578,551 | B2 | * | 8/2009 | Linero | 297/107 |
| 7,823,950 | B2 | * | 11/2010 | Toyota et al. | 296/65.01 |
| 2004/0174038 | A1 | * | 9/2004 | Sumida et al. | 296/65.09 |

* cited by examiner

*Primary Examiner* — Glenn Dayoan
*Assistant Examiner* — Gregory Blankenship
(74) *Attorney, Agent, or Firm* — Barnes & Thornburg LLP (57) ABSTRACT

A vehicle seat unit includes a left-side passenger seat, a right-side passenger seat, and a middle passenger seat positioned to lie therebetween.

22 Claims, 6 Drawing Sheets

VEHICLE SEAT WITH BACK-SUPPORT AND SHOULDER-SUPPORT WINGS

BACKGROUND

The present disclosure relates to a seat and particularly to a seat for use in a vehicle. More particularly, the present disclosure relates to a vehicle seat unit including a left-side passenger seat, a middle passenger seat, and a left-side passenger seat.

SUMMARY

A vehicle seat unit in accordance with the present disclosure includes a left-side passenger seat, a right-side passenger, and a middle seat. The middle seat is arranged to lie between the left-side and right-side passenger seat. The left-side passenger seat, right-side passenger seat, and middle seat cooperate to provide seating space for up to three passengers.

In illustrative embodiments, the middle seat includes a middle seat base and a middle seat back extending upwardly away from a back edge of the middle seat base. The middle seat back includes a movable left wing and a movable right wing. The left wing is mounted to pivot in a clockwise direction about a left inner pivot axis from a retracted back-support position aligned with a back edge of the middle seat base toward the left-side passenger seat to provide a left shoulder support for use by a passenger resting in the left-side passenger seat. The right wing is mounted to pivot in a counterclockwise direction about a right inner pivot axis from a retracted back-support position aligned with the back edge of the middle seat base and alongside the left wing toward the right-side passenger seat to provide a right shoulder support for use by a passenger resting in the right-side passenger seat.

In illustrative embodiments, the left-side passenger seat includes a left seat base and a left seat back extending upwardly away from a back edge of the left seat base. In illustrative embodiments, the left-side passenger seat further includes a left outer wing mounted to pivot about a left outer pivot axis from a storage position aligned with the left seat back toward a deployed position to provide a left outer shoulder support for use by a passenger sitting on the left seat base of the left-side passenger seat.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIGS. 9-11 show a series of perspective views illustrating another embodiment of an inner wing that includes a lower bolster and an articulating head bolster;

FIG. 12 is a perspective view of yet another embodiment of a vehicle seat unit showing that the vehicle seat unit further includes a left outer wing shown in a storage position on the

DETAILED DESCRIPTION

Figure 12:
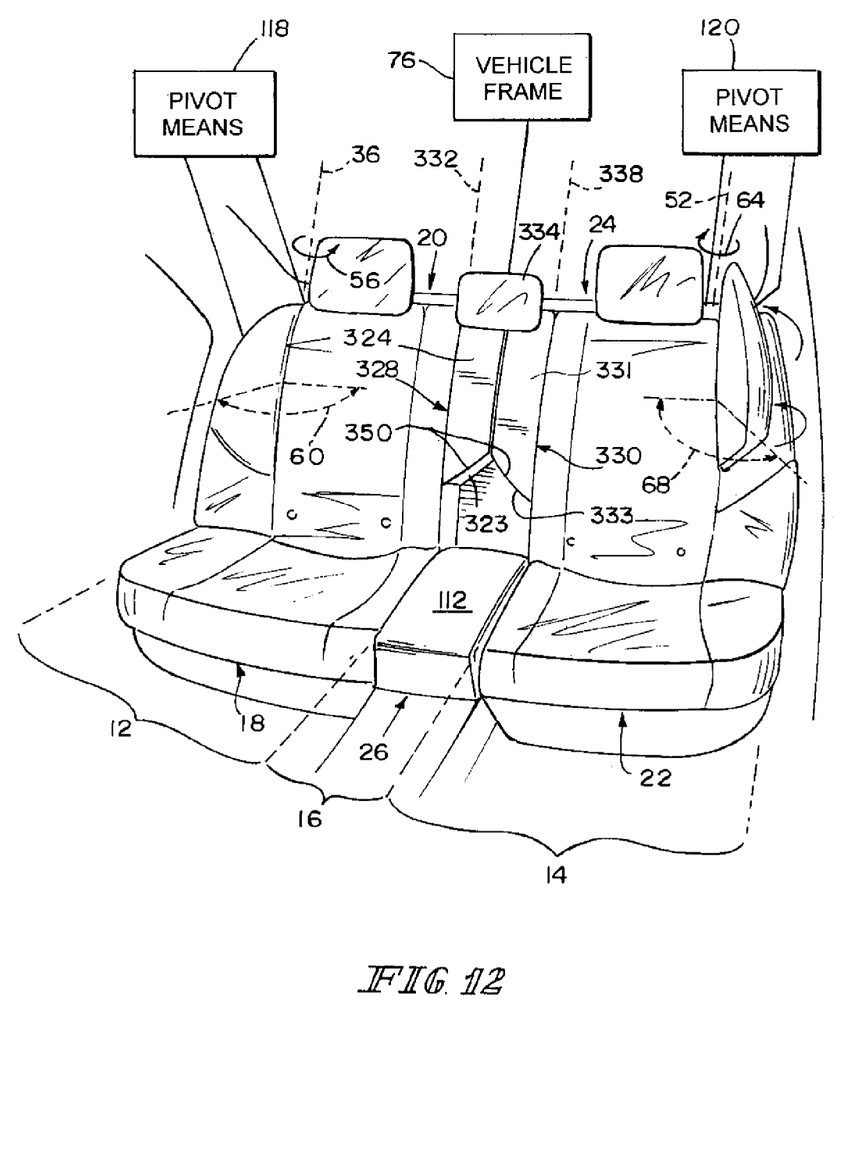

A first embodiment of a vehicle seat unit 10, as shown in FIGS. 1-8, includes a left-side passenger seat 12, a right-side passenger 14, and a pair of inner wings 28, 30 positioned to lie between passenger seats 12, 14. Inner wings 28, 30 are configured to establish a middle seat back 72 as suggested in FIG. 1 or to establish a pair of shoulder supports as suggested in FIG. 5. Another vehicle seat unit 200 shown in FIGS. 9-11 includes a second embodiment of inner side wings 228, 230. Inner side wings 228, 230 are movable to an extended shoulder-support position, as shown in FIG. 11 like inner side wings 28, 30, but inner wings 228, 230 also include upper head supports 226, 229 which are movable as suggested in FIGS. 10 and 11. Yet another embodiment of vehicle seat unit 300 is shown in FIG. 12. Vehicle seat unit 300 includes a pair of outer wings 54, 58 that provide additional shoulder supports for passengers seated in left-side and right-side passenger seats.

Figures 1, 2, 3, 4:
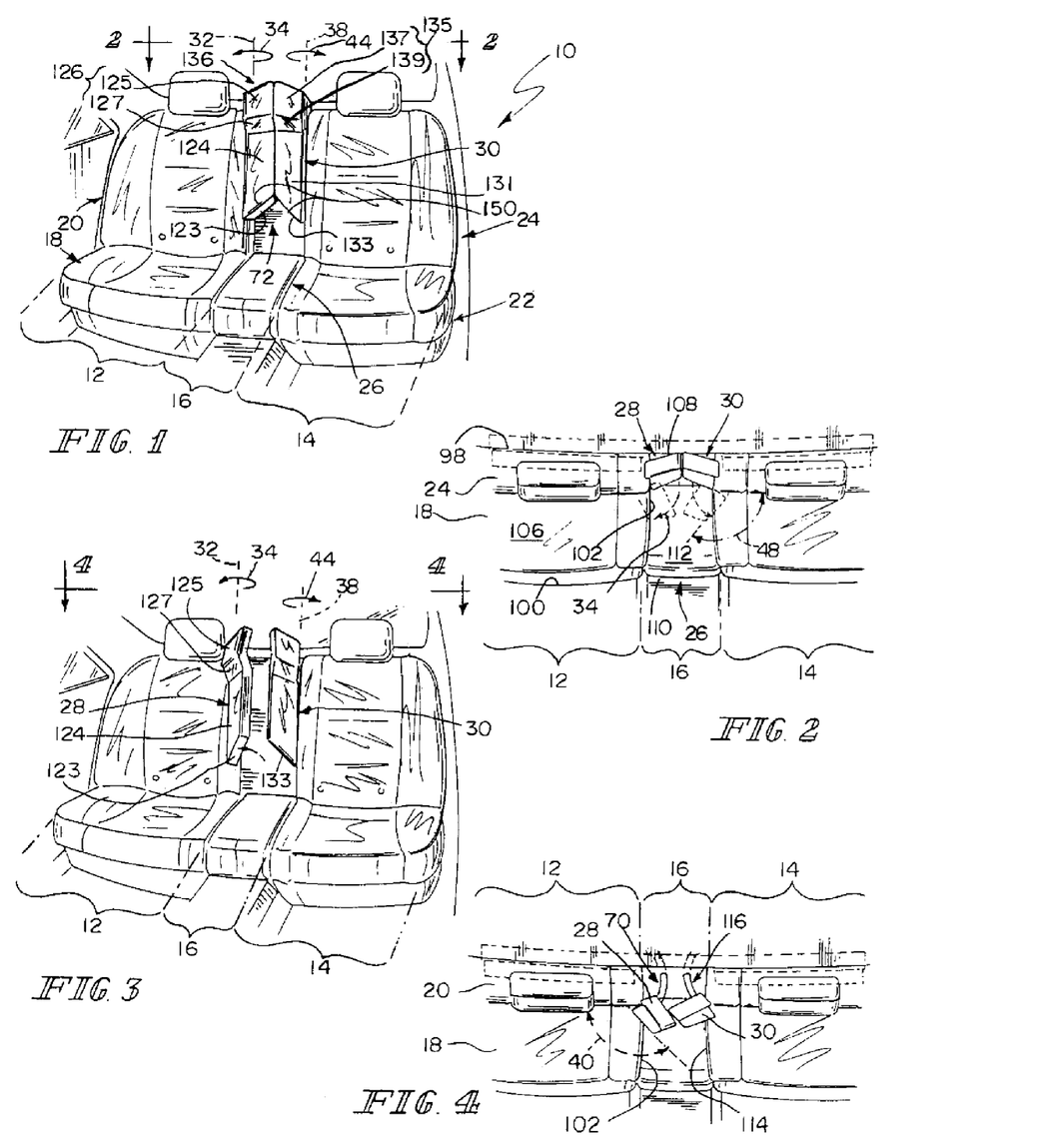
FIG. 1 is a perspective view of a vehicle seat unit in accordance with the present disclosure showing that the seat unit includes a right-side passenger seat, a left-side passenger seat, and a pair of inner wings cooperating to form a middle seat back located between the left-side and right-side passenger seats and suggesting that the inner wings are mounted for movement about two upright parallel axes relative to one another in opposite directions between retracted back-support positions as suggested in FIGS. 1 and 2 and extended shoulder-support positions as suggested in FIG. 3-5.
FIG. 2 is partial top plan view taken in the direction of line 2-2 of FIG. 1 showing that the inner wings are mounted for movement about an axis between retracted back-support positions (shown in solid) where they cooperate to form a middle seat back and extended shoulder-support positions (shown in phantom) wherein they cooperate to provide separate shoulder supports for each of the left-side and right-side seat backs.
FIG. 3 is a view similar to FIG. 1 showing that the left inner wing is in an extended shoulder-support position and showing that the right inner side wing is moving from the retracted back-support position shown in solid in FIG. 1 toward the extended shoulder-support position shown in phantom in FIG. 2.
FIG. 4 is a partial top plan view taken in the direction of line 4-4 of FIG. 3.
Figure 6:
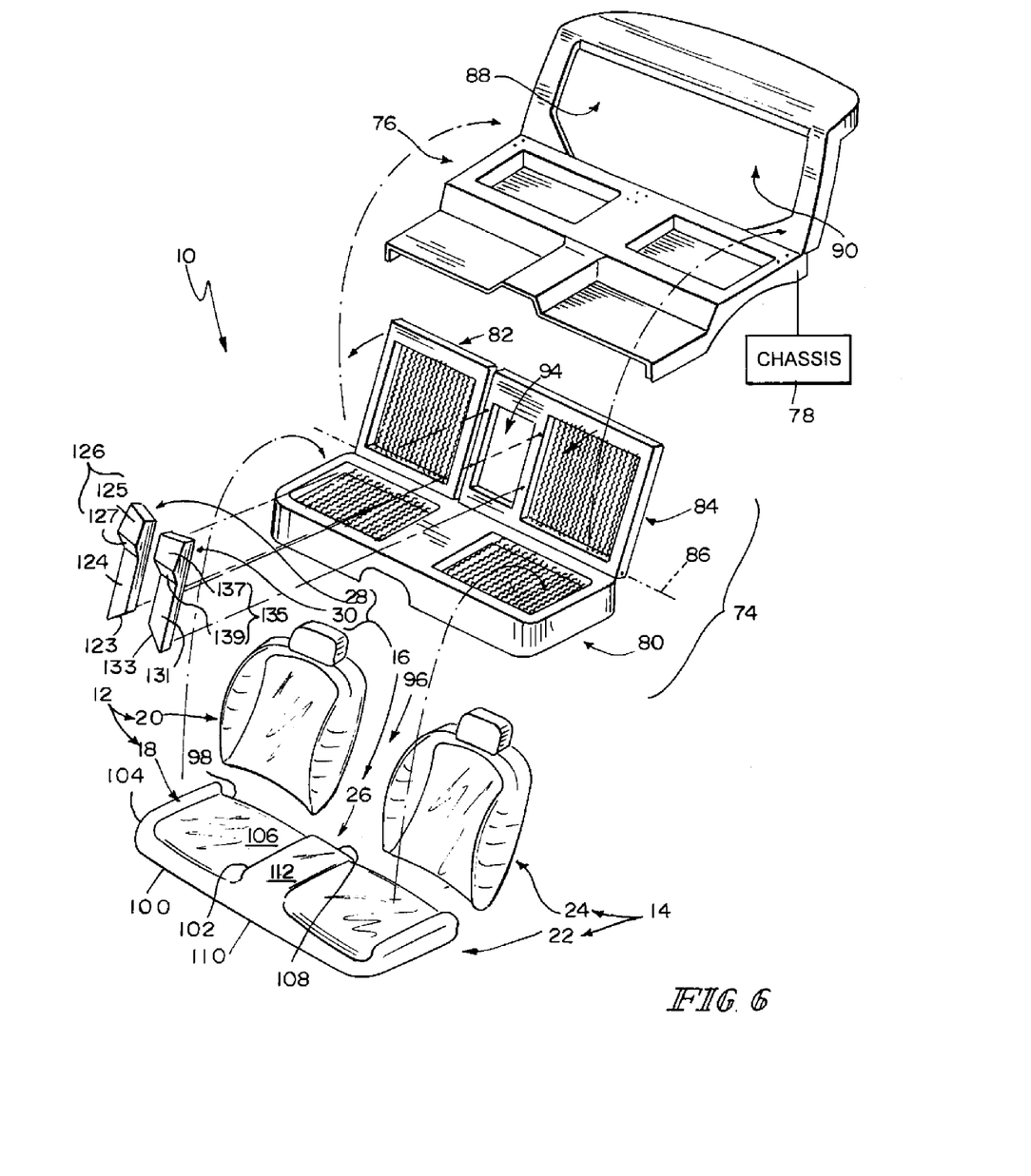
FIG. 6 is an exploded perspective assembly view of the vehicle seat unit of FIGS. 1-5 showing (from bottom to top) a left seat base and left seat back, a middle seat base, a right seat base and right seat back, a seat frame including a stationary seat-base support, a left seat-back support, and a right seat-back support formed to include a pass-through aperture, and a pair of inner wings coupled to the right seat-back support, and suggesting that the seat unit is coupled to a vehicle frame included in the chassis of an automobile.

As shown in FIG. 1, a vehicle seat unit 10 comprises a left-side passenger seat 12, a right-side passenger seat 14, and a partition 16 arranged to lie between left-side and right-side passenger seats 12, 14. As shown in FIG. 6, left-side passenger seat 12 includes a left seat base 18 and a left seat back 20 extending upwardly from left seat base 18. Right-side passenger seat 14 include a right seat base 22 and a right seat back 24 extending upwardly from right seat base 22. Partition 16, as suggested in FIG. 6, includes a middle seat base 26, a left inner wing 28, and a right inner wing 30. Middle seat base 26 is located between the left and right seat bases 18, 22 and shown in FIG. 6. Left and right inner wings 28, 30 arranged to lie between the left and right seat backs 20, 24.

Figure 5:
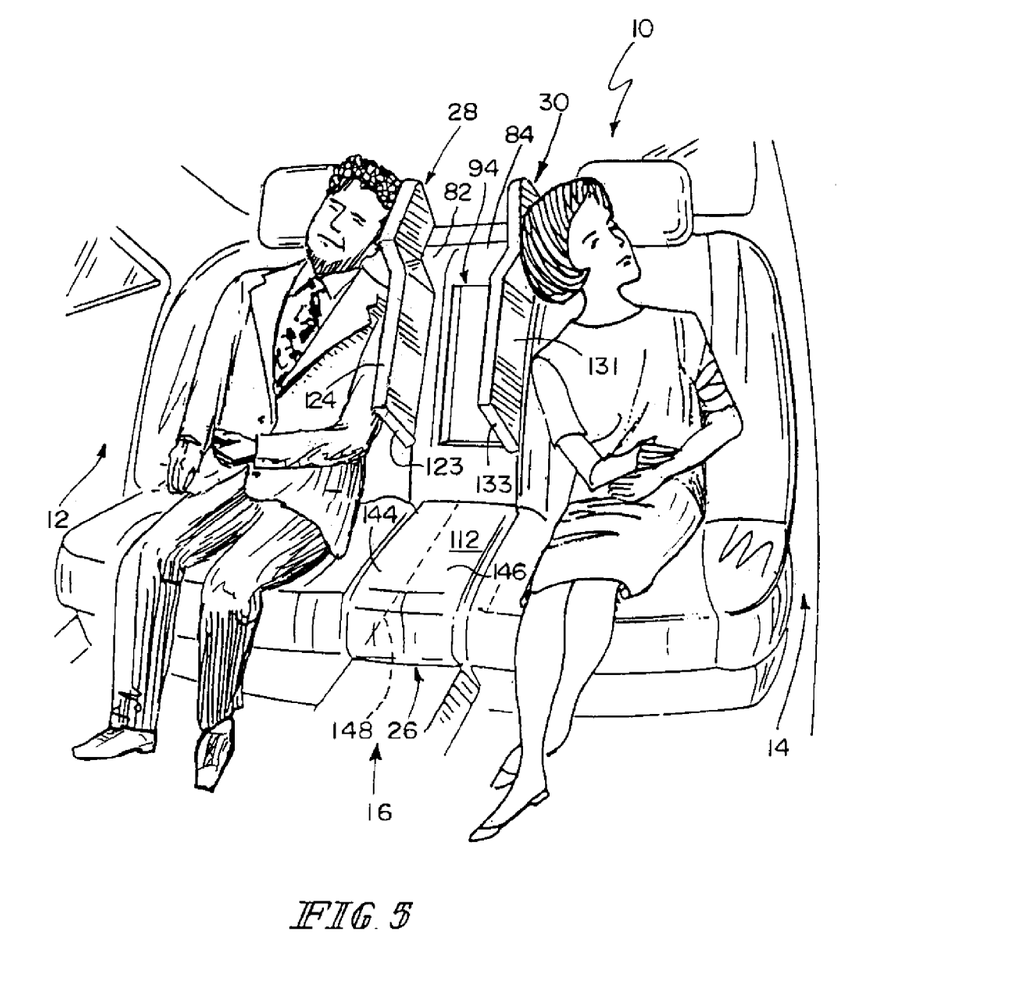
FIG. 5 is a perspective view similar to FIG. 3 showing both the left and right inner wings in the extended shoulder-support positions and showing a first passenger in a right-tilted position resting against the left inner wing while seated in the left-side passenger seat and a second passenger in a left-tilted position resting against the right inner wing while seated in the right-side passenger seat.

Left inner wing 28, as shown in FIGS. 1-4, is configured to pivot about a left inner pivot axis 32 in a clockwise direction 34 from a retracted back-support position shown in FIG. 1 toward an extended shoulder-support position as shown in FIGS. 3 and 5. Left inner wing 28 is located between the left and right seat backs 20, 24 and provides a first portion of a middle seat back 72 as illustrated in FIGS. 1 and 2 when moved to assume the retracted back-support position. Left inner wing 28 when moved to assume the extended shoulder-support position establishes a left shoulder support positioned to lie above middle seat base 26 and at a first included angle 40 relative to left seat back 20 as shown in FIGS. 3-5.

Right inner wing 30 is similar to left inner wing 28 and is configured to pivot about a right inner pivot axis 38 in a counterclockwise direction 44 from a retracted back-support position shown in FIG. 1 toward an extended shoulder-support position shown in FIG. 5. Right inner wing 30, when in the retracted back-support position, is located between left and right seat backs 20, 24 and provides a second portion of middle seat back 38. Right inner wing 28, when in the extended shoulder-support position, is arranged to lie over middle seat base 26 and to lie at a second included angle 48 relative to right seat back 24 to form a right shoulder support.

As shown in FIG. 12, left-side passenger seat 12 further includes a left outer wing 54 supported to rotate in a counterclockwise direction 56 about a left outer pivot axis 36 relative to left seat back 20 from a stored position shown in FIG. 12 toward a deployed position as suggested by a right outer wing 58 also shown in FIG. 12. Left outer wing 54, when in the stored position, cooperates with left seat back 20 to form a third included angle 60 therebetween. Left outer wing 54 moves through a relatively smaller fourth included angle (not shown) when moving to the deployed position as suggested in FIG. 12.

Right outer wing 58, similar to left outer wing 54, is supported to rotate in a clockwise direction 64 about a right outer pivot axis 52 relative to right seat back 24 from a stored position to a deployed positioned shown in FIG. 12. Right outer wing 58, when in the stored position, cooperates with right seat back 24 to form a fifth included angle (not shown) therebetween. In moving to the deployed position, right outer wing 58 moves through a relatively smaller sixth angle 68 as shown in FIG. 12.

Figure 7:
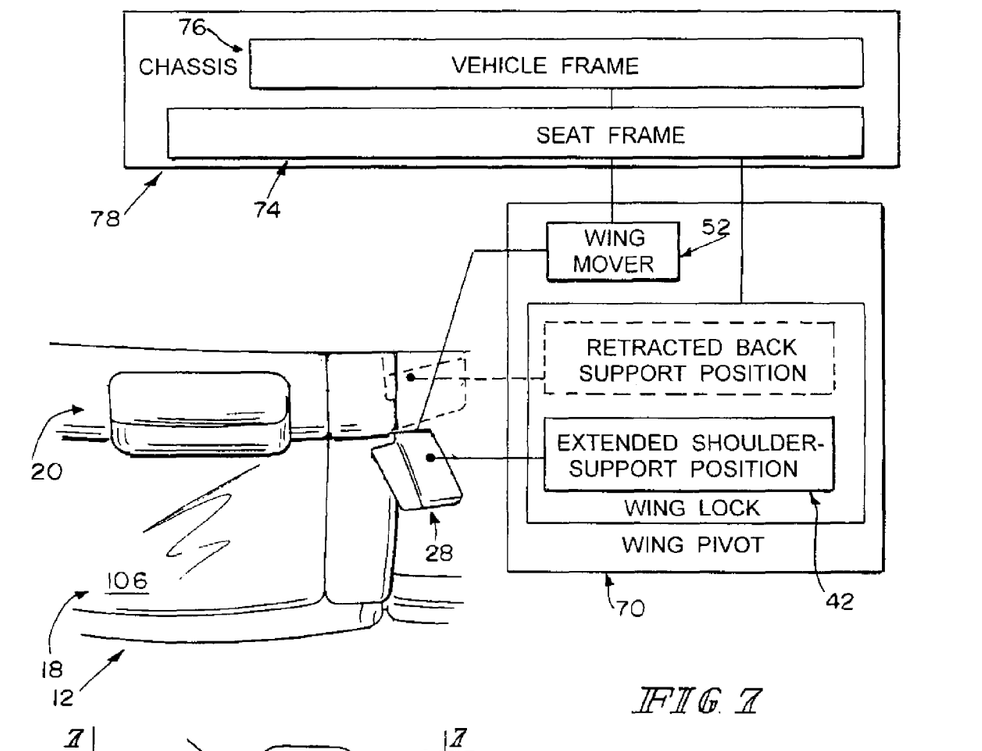
FIG. 7 includes a partial top plan view taken in the direction of line 7-7 of FIG. 8 showing a left-side passenger seat and a left inner wing in the extended shoulder-support position and a diagrammatic view suggesting that the vehicle seat unit further includes a wing pivot comprising a wing mover used to move the left inner wing between the extended shoulder-support position shown in solid and the retracted back-support position shown in phantom and a wing lock used by a passenger to retain the left inner wing in either the extended shoulder-support position or the retracted back-support position.

Vehicle seat unit 10, as shown in FIG. 7, further includes means 70 for selectively locking left and right inner wings 28, 30 in the retracted back-support positions and in the extended shoulder-support positions to block movement of each wing 28, 30 relative to middle seat base 26 at the option of a vehicle passenger. When left and right inner wings 28, 30 are in the retracted back-support positions, they cooperate to establish a middle seat back 72 as shown in FIG. 1. When left and right inner wings 28, 30 are in the extended shoulder-support positions, they cooperate to establish left and right shoulder supports as shown in FIG. 5.

Illustratively, means 42 for selectively locking left and right inner wings 28, 30 may be any suitable locking mechanism. Illustrative mechanisms include, but are not limited to, a magnetic latch, a four-bar over-center mechanism, a friction hinge, a push/push latch, a manual locking mechanism, or a powered mechanism. As an example, controls for a powered mechanism may be placed on the companion seat base or on the companion door next to the seat base. In execution, any suitable alternative may be used which does not inhibit the functioning of the inner and outer wings.

Vehicle seat unit 10 also includes a seat frame 74 as shown in FIG. 6. Seat frame 74 is adapted to mount to a vehicle frame 76 that is arranged to lie behind and below seat frame 74. Seat frame 74 and vehicle frame 76, as well as other components, cooperate to establish a chassis 78 which functions to support the vehicle on the ground. Seat frame 74 includes illustratively a seat-base support 80, left seat-back support 82, and a right seat-back support 84. As an example, seat-base support 80 interconnects left seat base 18, right seat base 22, and middle seat base 26 to chassis 78 and provides cushioning during use of vehicle seat unit 10.

Left seat-back support 82 operates to support left seat back 20 during use. Illustratively, left seat-back support 82 is movable about a seat-back support axis 86 between a lowered position and a raised position shown in FIG. 6. Left seat-back support 82 moves toward left seat base 18 to cause left seat back 20 to lie in confronting relation with left seat base 18 thereby assuming the lowered position. When in the lowered position, a portion of a trunk-access aperture 88 formed in vehicle frame 76 is exposed allowing access to a trunk space 90 formed in vehicle frame 76.

Right seat-back support 84, similar to left seat-back support 82, is configured to move between a raised position and a lowered position as suggested in FIG. 6. Illustratively, right seat-back support 84 includes a partition support 92 extending toward left seat-back support 82. Partition support 92 is configured to support left and right inner wings 28, 30. Partition support 92 is formed illustratively to include a pass-through aperture 94 arranged to open into trunk space 90. Pass-through aperture 94 permits access to trunk space 90 when left and right inner wings 28, 30 are in the extended shoulder-support position and right seat-back support 84 is in the raised position.

As shown in FIGS. 2 and 6, left-side passenger seat 12 and right-side passenger 14 are arranged to lie in spaced-apart relation to one another to define a middle seating space 96 therebetween. Left seat base 18 of left-side passenger seat 12 includes a back edge 98, a front edge 100, an inner edge 102, and an outer edge 104. Inner and outer edges 102, 104 are arranged to extend in spaced-apart relation to one another between back and front edges 98, 100 to define a left-side seating surface 106 therebetween. As shown in FIG. 6, left seat back 20 is arranged to extend in an upward direction away from left seat base 20 at back edge 98.

Illustratively, middle seat base 26 is positioned to lie in middle seating space 96 as suggested in FIGS. 1, 2, and 6. Middle seat base 26 is formed to include a back edge 108 and a front edge 110 as shown in FIGS. 1 and 6. Illustratively, back edge 108 of middle seat base 26 is spaced apart from front edge 110 to define a middle seating surface 112 therebetween.

Middle seat base 26 is positioned to lie between left-side passenger seat 12 and right-side passenger seat 14 as shown in FIGS. 1-3. A middle seat back 72 is formed in response to inner wings 28, 30 moving to the retracted back-support position as shown in FIG. 1. Left and right shoulder supports are established in response to movement of inner wings 28, 30 to assume the extended shoulder-support positions. Multiple pivot means included in vehicle seat unit 10 cooperate to support the wings during movement to the various positions.

As shown in FIGS. 4 and 7, vehicle seat unit 10 includes left pivot means 70 for supporting left inner wing 28 for pivotable movement from the retracted back-support position lying along back edge 108 of middle seat base 26 to provide a first portion of middle seat back 72 about left inner pivot axis 32 in clockwise direction 34 toward inner edge 102 of left-side passenger seat 12. Left inner wing 28 moves through first included angle 40 to assume the extended shoulder-support position lying above middle seat base 26 to provide the left shoulder support.

Right inner wing 30 is also arranged to lie in middle seating space 96 between left inner wing 28 and right-side passenger seat 14 as illustrated in FIGS. 3 and 4. Illustratively, vehicle seat unit 10 includes right inner pivot means 116 for supporting right inner wing 30 for pivotable movement from the retracted back-support position lying along back edge 108 of middle seat base 26 to provide a second portion of middle seat back 72 associated with middle seat base 26 about right inner pivot axis 38 in counterclockwise direction 44 toward an inner edge 114 of right seat base 22. Right inner wing 30 moves through second included angle 48 to assume the extended shoulder-support position lying above middle seat base 26 to provide the right shoulder support associated with right-side passenger seat 14.

A vehicle seat unit 300 also includes a pair of outer wings 54, 58 as shown in FIG. 12. Outer wings 54, 58, when in the storage positions, operate as bolsters to minimize movement of a passenger sitting in the passengers seats. Outer wings 54, 58, when in the deployed positions, provide another option for a passenger sitting in the left-side or right-side passenger seat to lean against the outer wing for support, for example, when a third person is using inner wings 28, 30 as a middle seat back 72 while sitting on middle seat base 26.

Left outer wing 54, as suggested in FIG. 12, is arranged to lie in spaced-apart relation to left inner wing 28 to cause left seat back 20 to lie between left outer wing 54 and left inner wing 28. Vehicle seat unit 10 further includes left outer pivot means 118 for supporting left outer wing 54 to move in a counterclockwise direction 56 relative to left seat back 20 from the stored position shown in FIG. 12 left outer wing 54 cooperates with left seat back 20 in a direction toward left inner wing 28 to form third included angle 60 (also known as first included outer angle 60) therebetween. Left outer wing 54 moves through relatively smaller fourth included angle 62 (also known as second included outer angle 62) to assume the deployed position similar to right outer wing 58 as shown in FIG. 12.

Right outer wing 58, as suggested in FIG. 12, is arranged to lie in spaced-apart relation to right inner wing 30 to cause right seat back 24 to lie between right outer wing 58 and right inner wing 30. Vehicle seat unit 10 further includes right outer pivot means 120 for supporting right outer wing 58 to move in clockwise direction 64 relative to right seat back 24 space from a stored position cooperating with right seat back 24 in a direction toward right inner wing 30 to form fifth included angle 66. Right outer wing 58 moves through a relatively smaller sixth included angle 68 to assume a deployed position as shown in FIG. 12. Illustratively, each of first, second, third, fourth, fifth, and sixth angles 40, 48, 60, and 68 are obtuse angles.

As an example, pivot means 114, 116 includes wing mover means 52 for moving wings 28, 30 between the retracted back-support positions and the extended shoulder-support positions. Pivot means 118, 120 include wing mover means 52 for moving wings 54, 58 relative to one another between the storage positions and the deployed positions. Pivot means 114, 116, 118, 120 further include a hinge configured to support wings 28, 30, 54, and 58 as they move and locked into their various positions.

Wing mover means may comprise a motor and a linkage configured to use energy generated by the motor to drive the wings. In implementation, any suitable mechanism may be used which allows the wings to function. The hinge, as an example, may be a four-bar over-center mechanism, or a friction hinge. In other embodiments, the hinge may be a motorized constant-friction hinge or a barber-pole out-and-up kinematic hinge. Illustratively, left and right inner pivot means 114, 116 and left and right outer pivot means 118, 120 are coupled to seat frame 74. Alternatively, pivot means 114, 116, 118, and 120 may be coupled to vehicle frame 76.

Figure 8:
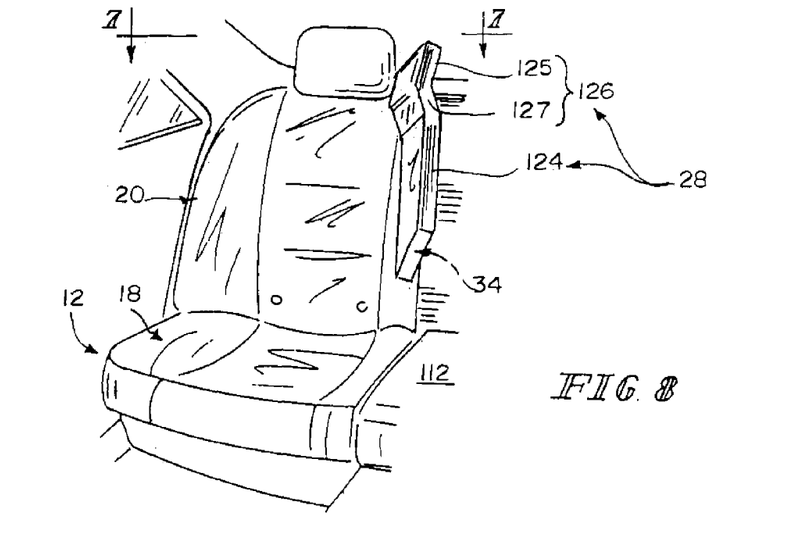
FIG. 8 is a partial perspective view of the left-side passenger seat and the left inner wing in the extended shoulder-support position.
Figures 9, 10, 11:
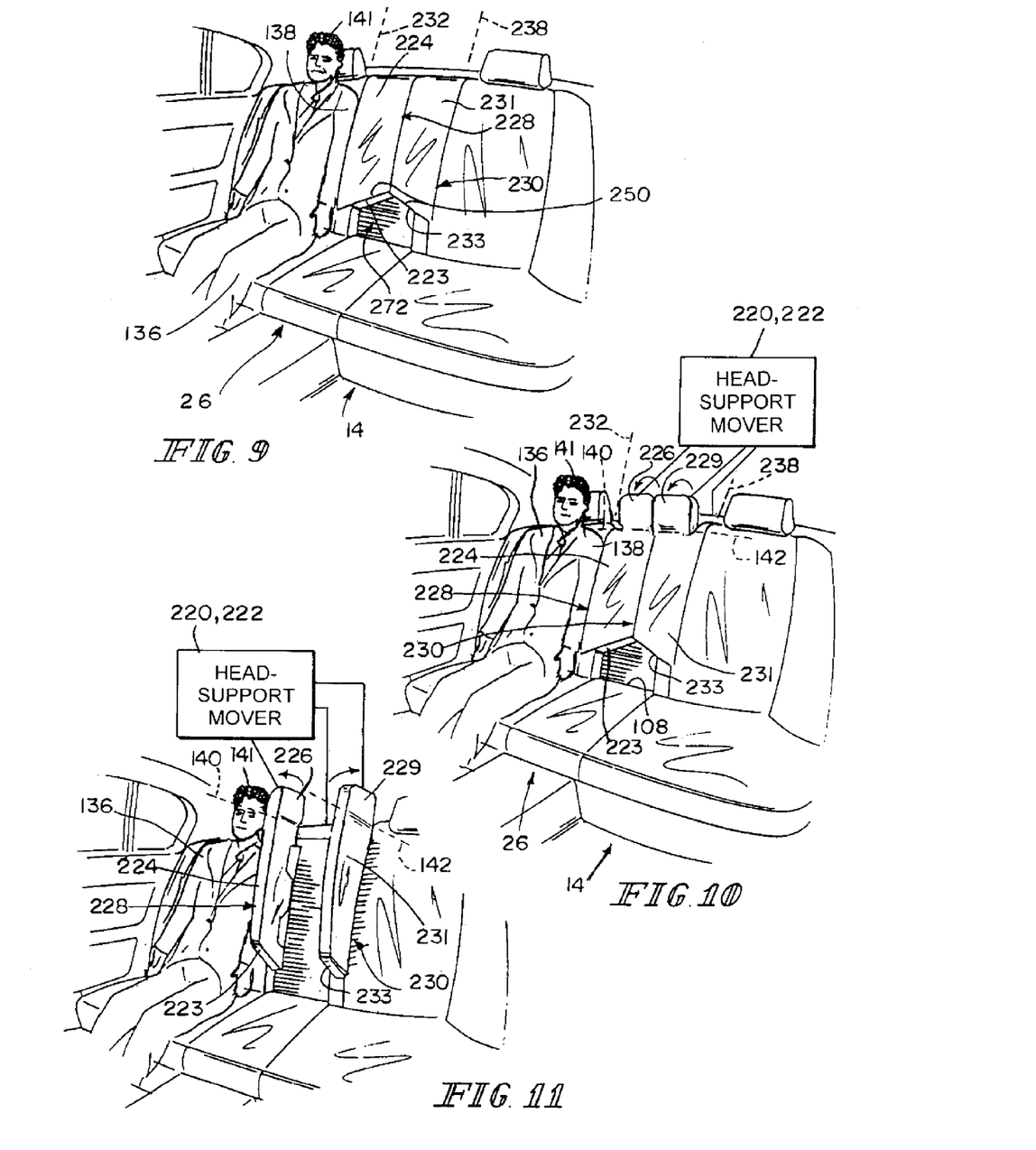
FIG. 9 is a perspective view of a vehicle seat unit including another embodiment of a pair of inner wings made in accordance with the present disclosure showing that the inner wings are in the retracted back-support positions establishing a middle seat back and the articulating head bolsters of the movable side wings are in a stored positions.
FIG. 10 is a view similar to FIG. 9 showing that the inner wings are in the retracted back-support positions maintaining the middle seat back and showing that the articulating head bolsters have been moved forwardly from the stored positions to in-use positions to establish a middle headrest for use by a passenger sitting on the middle seat base.
FIG. 11 is a view similar to FIG. 10 showing that the inner wings have been rotated to the extended shoulder-support positions for use by passengers in the right-side and the left-side passenger seats and suggesting that the articulating head bolsters may be adjusted by the passengers to maximize their comfort while using the shoulder supports.

A first embodiment of inner wings 28, 30 is shown in FIGS. 1-8, another embodiment of inner wings 228, 230 is shown in FIGS. 9-11, and yet another embodiment of inner wings 328, 330 is shown in FIG. 12. As shown in FIGS. 1, 6, and 8, left inner wing 28 includes a body support 124 and head support 126. Head support 126 is coupled to body support 124 to move therewith and arranged to extend in the upward direction away from middle seating surface 112. As shown in FIGS. 1 and 6, illustrative body support 124 is substantially flat and is formed to include a lower edge 123 extending in an upward direction at angle relative to left inner pivot axis 32.

Head support 126, as shown in FIGS. 1 and 6, includes a pad 125 and an angled pad mount 127. Angled pad mount 127 interconnects pad 125 to body support 124. Angled pad mount 127 extends upwardly at an angle relative to body support 124. Pad 127 is configured to support the head of a passenger sitting on either middle seat base 26 or left seat base 18. Pad 127 is positioned to lie in a first plane and body support 124 is positioned to lie in a second plane. The second plane is arranged to lie between the first plane and back edge 108 of middle seat base 26 when left inner wing 28 is in the retracted body-support position.

Right inner wing 30 is substantially similar to left inner wing 28 as shown in FIG. 6. Right inner wing 30 includes a head support 129 and a body support 131. Body support 131 is formed to include a lower edge 133 configured to extend in an upward direction relative to right inner pivot axis 38. When both inner wings 28, 30 are in the retracted body-support positions, lower edges 123, 133 cooperate to form an inverted V-shaped notch 150 shown in FIG. 1.

Head support 135 of right inner wing 30 includes a pad 137 and angled pad mount 139 as illustrated in FIG. 6. Angled pad mount 139 interconnects pad 137 to body support 131. Angled pad mount 139 extends upwardly at an angle relative to body support 131. Pad 137 is configured to support the head of a passenger sitting on either middle seat base 26 or right seat base 22. Pad 137 is positioned to lie in the first plane and body support 124 is positioned to lie in the second plane.

An alternative embodiment of inner wings 228, 230 is shown in FIGS. 9-11. Left inner wing 228 includes a back support 224, a head support 226, and head-support mover means 222 for moving head support 226 in back-and-forth movement about a left articulation axis 140 between a lowered-storage position shown in FIG. 9 and a raised-use position shown in FIGS. 10 and 11. Head-support mover means 222 illustratively is a mechanical linkage, but may be an electromechanical linkage. In execution, any suitable alternative may be used.

Body support 224 of left inner wing 228 is substantially similar to body support 124 of left inner wing 28. Illustratively, body support 224 is substantially flat and arranged to lie in a first vertical plane when left inner wing 228 is in the retracted back-support position as shown in FIG. 9. Body support 224 is formed to include a lower edge 223 which is arranged to extend in an upward direction at angle relative to a left inner pivot axis 232.

Right inner wing 230 is substantially similar to left inner wing 228 as shown in FIGS. 9-11. Right inner wing 230 includes a body support 231, a head support 229, and a head support mover 220. Head support mover 220 cooperates with body support 231 and head support 229 to function such that right inner wing operates substantially the same as left inner wing 228. Body support 231 is also formed to include a lower edge 233 arranged to extend in an upward direction at an angle relative to a left inner pivot axis 238. When left and right inner wings 228, 230 are in the retracted body-support positions, lower edges 223, 233 cooperate to establish an inverted V-shaped notch 250 shown in FIG. 9.

As illustrated in FIG. 9, inner wings 228, 230 cooperate to establish middle seat back 272 upon movement of inner wings 228, 230 to the retracted back-support positions. Illustratively, left and right articulation axes 140, 142 are aligned in spaced-apart parallel relation above back edge 108 of middle seat base 26 when inner wings 228, 230 are in the retracted back-support positions. Upon movement of inner wings 228, 230 to the retracted back-support positions and movement of head supports 226, 229 to the raised-use positions, head supports 226, 229 cooperate to establish a middle headrest as shown in FIG. 10.

As shown in FIG. 11, inner wings 228, 230 may be moved to the extended shoulder-support positions while head supports 226, 229 are in the raised-use positions to establish left and right shoulder supports. As shown in FIG. 11, a passenger 136 may rest his shoulder 138 against body support 231 and his head 141 against head support 226 for additional comfort.

An alternative embodiment of inner wings 328, 330 is shown in FIG. 12. Illustratively, left inner wing 328 includes a body support 326. A middle headrest 334 is included in vehicle seat unit 300 and is mounted illustratively to vehicle frame 76 for movement relative to inner wings 328, 330. As shown in FIG. 12, body support 326 is formed to include a lower edge 323 extending in an upward direction at an angle relative to inner left pivot axis 332. Right inner wing 330 also includes a body support 331 that is formed to include a lower edge 333 extending in an upward direction at angle relative to inner right pivot axis 338. When inner wings 328, 330 are in the retracted back-support positions, as shown in FIG. 12, lower edges 333 cooperate to establish an inverted V-shaped notch 350.

As shown in FIG. 6, vehicle seat unit 10 illustratively includes seat frame 74, right-side passenger seat 14, left-side passenger seat 12, middle seat base 26, and left inner wing 28. Illustratively, left inner wing 28 is arranged to lie in middle seating space 96. Left inner wing 28 is coupled illustratively to seat frame 74 to rotate about left inner pivot axis 32 in clockwise direction 34 through first included angle 40 as shown in FIG. 4 from the retracted back-support position to the extended shoulder-support position. Left inner wing 28, when in the retracted back-support position, is aligned with the back edge 108 of middle seat base 26. Left inner wing 28 moves away from back edge 108 toward front edge 100 of left seat base 18 to assume left shoulder support 42 when in the extended shoulder-support position as shown in FIGS. 4 and 5.

Middle seating surface 112 of middle seat base 26 is formed to include a first half 144 and a second half 146 as shown in FIG. 5. First half 144 is separated from second half 146 by a line 148 extending in the forward direction. As shown in FIG. 5, left inner wing 28 is positioned to lie only above first half 144 of middle seating surface 12 during movement from the retracted back-support position to the extended shoulder-support position. Right inner wing 30 is positioned to lie only above second half 146 of middle seating surface 112 during movement from the retracted back-support position to the extended shoulder-support position as illustrated in FIG. 6.

Inner and outer wings of vehicle unit seat cooperate with the passenger seats to give the passengers seated in the passenger seats a good seating experience. In particular, the wings permit a passenger to rest in a tilted position against the wings and rest more comfortably. The inner wings also cooperate to form a middle seat back when in the retracted back-support position thus allowing a third passenger to be seated on the vehicle seat unit when desired. The inner wings may operate as a back support for a middle passenger or as shoulder supports for left and right passengers thereby maximizing the flexibility and comfort of the vehicle seat unit.

The invention claimed is:

1. A vehicle seat unit comprising
a left-side passenger seat including a left seat base and a left seat back extending upwardly from the left seat base,
a right-side passenger seat including a right seat base and a right seat back extending upwardly from the right seat base,
a partition located between the left-side and right-side passenger seats, wherein the partition includes a non-rotatable middle seat base located between the left and right seat bases, a left inner wing supported for clockwise pivotable movement relative to the middle seat base from a retracted back-support position located between the left and right seat backs to form a first portion of a middle seat back extending upwardly from the middle seat base and an extended shoulder-support position arranged to lie over the middle seat base and at a first included angle to the left seat back to form a left shoulder support associated with the left-side passenger seat, and a right inner wing supported for counterclockwise pivotable movement relative to the middle seat base from a retracted back-support position located between the left and right seat backs to form a second portion of the middle seat back and an extended shoulder-support position arranged to lie over the middle seat base and at a second included angle to the right seat back to form a right shoulder support associated with the right-side passenger seat, and wherein each of the left and right inner wings includes a bottom edge directly adjacent to the seat base.

2. The vehicle seat unit of claim 1, wherein the left-side passenger seat further includes a left outer wing supported for counterclockwise pivotable movement relative to the left seat back from a stored position cooperating with the left seat back in a direction toward the left inner wing to form a third included angle therebetween to assume a deployed position cooperating with the left seat back to form a relatively smaller fourth included angle therebetween and the right-side passenger seat include a right outer wing supported for clockwise pivotable movement relative to the right seat back from a stored position cooperating with the right seat back in a direction toward the right inner wing to form a fifth included angle therebetween to assume a deployed position cooperating with the right seat back to form a relatively smaller sixth angle therebetween.

3. The vehicle seat unit of claim 1, further comprising means for selectively locking the left and right inner wings in the retracted back-support positions to establish the middle seat back and locking the left and right inner wings in the extended shoulder-support positions to establish left and right shoulder supports.

4. A vehicle seat unit comprising
a seat frame adapted to mount on a vehicle frame,
a right-side passenger seat coupled to the seat frame, the right-side passenger seat including a right seat base and a right seat back extending in an upward direction away from the right seat base,
a left-side passenger seat coupled to the seat frame and arranged to lie in spaced-apart relation to the right-side passenger seat to define a middle-seating space therebetween, the left-side passenger seat including a left seat base having a back edge, a front edge, and inner and outer side edges extending in spaced-apart relation to one another from the back edge to the front edge to define a left-side seating surface therebetween on the left seat base and a left seat back extending in an upward direction away from the left seat base at the back edge,
a middle seat base arranged to lie between the left-side passenger seat and the right-side passenger seat in the middle-seating space, the middle seat base being formed to include a back edge and a front edge positioned to lie in spaced-apart relation to the back edge to define a middle seating surface extending therebetween,
a left inner wing arranged to lie in the middle-seating space between the left-side and right-side passenger seats, and
left inner pivot means for supporting the left inner wing for pivotable movement from a retracted back-support position lying along the back edge of the middle seat base to provide a first portion of a middle seat back associated with the middle seat base about a left inner pivot axis in a clockwise direction toward the inner side edge of the left-side passenger seat and through a first included angle to assume an extended shoulder-support position lying above the middle seat base to provide a left shoulder support associated with the left-side passenger seat.

5. The vehicle seat unit of claim 4, further comprising a right inner wing arranged to lie in the middle-seating space between the left inner wing and the right-side passenger seat and right inner pivot means for supporting the right inner wing for pivotable movement from a retracted back-support position lying along the back edge of the middle seat base to provide a second portion of the middle seat back associated with the middle seat base about a right inner pivot axis in a counterclockwise direction toward an inner side edge of the right-side passenger seat and through a second included angle to assume an extended shoulder-support position lying above the middle seat base to provide a right shoulder support associated with the right-side passenger seat.

6. The vehicle seat unit of claim 5, further comprising a left outer wing arranged to lie in spaced-apart relation to the left inner wing to cause the left seat back to lie between the left outer and inner wings and left outer pivot means for supporting the left outer wing for counterclockwise pivotable movement relative to the left seat back from a stored position cooperating with the left seat back in a direction toward the left inner wing to form a third included angle therebetween to assume a deployed position cooperating with the left seat back to form a relatively smaller fourth included angle therebetween.

7. The vehicle seat unit of claim 6, further comprising a right outer wing arranged to lie in spaced-apart relation to the right inner wing to cause a right seat back to lie between the right outer and inner wings and right outer pivot means for supporting the right outer wing for clockwise pivotable movement relative to the right seat back from a stored position cooperating with the right seat back in a direction toward the right inner wing to form a fifth included angle therebetween to assume a deployed position cooperating with the right seat back to form a relatively smaller sixth included angle therebetween.

8. The vehicle seat unit of claim 7, wherein each of the first, second, third, fourth, fifth, and sixth included angles is an obtuse angle.

9. The vehicle seat unit of claim 8, wherein the left and right inner pivot means are coupled to the seat frame.

10. The vehicle seat unit of claim 4, further comprising a left outer wing arranged to lie in spaced-apart relation to the left inner wing to cause the left seat back to lie between the left outer and inner wings and left outer pivot means for supporting the left outer wing for counterclockwise pivotable movement relative to the left seat back from a stored position cooperating with the left seat back in a direction toward the left inner wing to form a third included angle therebetween to assume a deployed position cooperating with the left seat back to form a relatively smaller fourth included angle therebetween.

11. The vehicle seat unit of claim 5, wherein the left inner wing includes a lower bolster and an upper bolster coupled to the lower bolster to articulate back and forth between a lowered-storage position extending in a rearward direction away from the front edge of the middle seat base toward the seat frame and a raised-use position extending in the upward direction away from the middle seating surface about a left articulation axis.

12. The vehicle seat unit of claim 11, wherein the right inner wing includes a lower bolster and an upper bolster coupled to the lower bolster to articulate back and forth between a lowered-storage position extending in the rearward direction and a raised-use position extending in the upward direction by rotating about a right articulation axis.

13. The vehicle seat unit of claim 12, wherein the left and right articulation axes are aligned and positioned in spaced-apart parallel relation above the back edge of the middle seat to cause the inner wings to cooperate to establish a middle seat back extending between the left-side and right-side passenger seats.

14. A vehicle seat unit comprising
a seat frame adapted to mount on a vehicle frame, a right-side passenger seat coupled to the seat frame, a left-side passenger seat coupled to the seat frame and arranged to lie in spaced-apart relation to the right-side passenger seat to define a middle-seating space therebetween, the left-side passenger seat including a left seat base having a back edge and a front edge defining a left-side seating surface extending therebetween and a left seat back extending in an upward direction away from the left seat base at the back edge, a middle seat base arranged to lie between the left-side passenger seat and the right-side passenger seat in the middle-seating space and the middle seat base is formed to include a back edge aligned with the back edge of the left-side passenger seat and a front edge defining a middle seating surface extending therebetween, and a left inner wing arranged to lie in the middle-seating space and coupled to the seat frame to rotate about a left inner pivot axis in a clockwise direction through a first included angle from a retracted back-support position arranged to align with the back edge of the middle seat base to provide a first portion of a middle seat back associated with the middle seat base toward an extended shoulder-support position arranged to extend away from the back edge of the middle seat toward the front edge of the middle seat to provide a left shoulder support associated with the left-side passenger seat.

15. The vehicle seat unit of claim 14, further comprising a right inner wing arranged to lie in the middle-seating space and coupled to the seat frame to rotate about a right inner pivot axis in a counterclockwise direction through a second included angle from a retracted back-support position arranged to align with the back edge of the middle seat to provide a second portion of a middle seat back associated with the middle seat base toward an extended shoulder-support position lying arranged to extend away from the back edge of the middle seat toward the front edge of the middle seat to provide a shoulder support associated with the right-side passenger seat.

16. The vehicle seat unit of claim 15, wherein the middle seating surface is formed to include a first half and a second half separated from the first half by a line extending in a forward direction and the left inner wing is positioned to lie only above the first half of the middle seating surface during movement from the retracted back-support position to the extended shoulder-support position.

17. The vehicle seat unit of claim 16, wherein the right inner wing is positioned to lie only above the second half of the middle seating surface during movement from the retracted back-support position to the extended shoulder-support position.

18. The vehicle seat unit of claim 15, further comprising a left outer wing coupled to the seat frame to rotate about left outer pivot axis between a stored position wherein the left outer wing is positioned to lie at a first included outer angle defined between a rear surface of the left outer wing arranged to face toward the seat frame and the back edge of the left-side passenger seat and an extended shoulder-support position wherein the left outer wing is arranged to lie at a relatively larger second included outer angle.

19. The vehicle seat unit of claim 15, wherein the first included outer angle is an obtuse angle.

20. The vehicle seat unit of claim 15, wherein the left seat base further includes an outer edger and an inner edge positioned to lie in spaced-apart relation to the outer edger, the inner and outer edges extend between the front and back edges of the left seat base, and the left inner pivot axis is defined by the intersection of the back edge and the inner edge of the left seat base to extend in the upward direction away from the middle seating surface.

21. A vehicle seat unit comprising a left-side passenger seat including a left seat base and a left seat back extending upwardly from the left seat base, a right-side passenger seat including a right seat base and a right seat back extending upwardly from the right seat base, a partition located between the left-side and right-side passenger seats, wherein the partition includes a middle seat base located between the left and right seat bases, a left inner wing supported for clockwise pivotable movement relative to the middle seat base from a retracted back-support position located between the left and right seat backs to form a first portion of a middle seat back extending upwardly from the middle seat base and an extended shoulder-support position arranged to lie over the middle seat base and at a first included angle to the left seat back to form a left shoulder support associated with the left-side passenger seat, and a right inner wing supported for counterclockwise pivotable movement relative to the middle seat base from a retracted back-support position located between the left and right seat backs to form a second portion of the middle seat back and an extended shoulder-support position arranged to lie over the middle seat base and at a second included angle to the right seat back to form a right shoulder support associated with the right-side passenger seat, and wherein the left-side passenger seat further includes a left outer wing supported for counterclockwise pivotable movement relative to the left seat back from a stored position cooperating with the left seat back in a direction toward the left inner wing to form a third included angle therebetween to assume a deployed position cooperating with the left seat back to form a relatively smaller fourth included angle therebetween and the right-side passenger seat include a right outer wing supported for clockwise pivotable movement relative to the right seat back from a stored position cooperating with the right seat back in a direction toward the right inner wing to form a fifth included angle therebetween to assume a deployed position cooperating with the right seat back to form a relatively smaller sixth angle therebetween.

22. A vehicle seat unit comprising a left-side passenger seat including a left seat base and a left seat back extending upwardly from the left seat base, a right-side passenger seat including a right seat base and a right seat back extending upwardly from the right seat base, a partition located between the left-side and right-side passenger seats, wherein the partition includes a middle seat base located between the left and right seat bases, a left inner wing supported for clockwise pivotable movement relative to the middle seat base from a retracted back-support position located between the left and right seat backs to form a first portion of a middle seat back extending upwardly from the middle seat base and an extended shoulder-support position arranged to lie over the middle seat base and at a first included angle to the left seat back to form a left shoulder support associated with the left-side passenger seat, and a right inner wing supported for counterclockwise pivotable movement relative to the middle seat base from a retracted back-support position located between the left and right seat backs to form a second portion of the middle seat back and an extended shoulder-support position arranged to lie over the middle seat base and at a second included angle to the right seat back to form a right shoulder support associated with the right-side passenger seat, and further comprising means for selectively locking the left and right inner wings in the retracted back-support positions to establish the middle seat back and locking the left and right inner wings in the extended shoulder-support positions to establish left and right shoulder supports.

* * * * *

UNITED STATES PATENT AND TRADEMARK OFFICE
CERTIFICATE OF CORRECTION

| | |
|---|---|
| PATENT NO. | : 7,980,617 B2 |
| APPLICATION NO. | : 12/503747 |
| DATED | : July 19, 2011 |
| INVENTOR(S) | : Gregory Brncick and Robert Fitzpatrick |

It is certified that error appears in the above-identified patent and that said Letters Patent is hereby corrected as shown below:

ON THE TITLE PAGE:

Item (73) Assignee, please change "Cosco Management, Inc., Wilmington, DE (US)" to
--Faurecia Automotive Seating, Inc., Troy, MI (US)--.

Signed and Sealed this
Seventeenth Day of April, 2012

David J. Kappos
*Director of the United States Patent and Trademark Office*